US009886715B2

(12) United States Patent
Kozak

(10) Patent No.: US 9,886,715 B2
(45) Date of Patent: Feb. 6, 2018

(54) ASSOCIATING INTERDEPENDENT SUBSCRIPTIONS

(71) Applicant: Red Hat, Inc., Raleigh, NC (US)

(72) Inventor: Carter Kozak, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 889 days.

(21) Appl. No.: 14/154,585

(22) Filed: Jan. 14, 2014

(65) Prior Publication Data

US 2015/0199747 A1 Jul. 16, 2015

(51) Int. Cl.
*G06Q 10/00* (2012.01)
*G06Q 30/06* (2012.01)

(52) U.S. Cl.
CPC ............... *G06Q 30/0635* (2013.01)

(58) Field of Classification Search
CPC ........... G06Q 30/0635; G06Q 30/0641; G06Q 30/06; G06Q 30/0601
USPC ................ 705/26.1, 26.7, 26.81, 26, 27, 28
See application file for complete search history.

(56) References Cited

U.S. PATENT DOCUMENTS

| | | | | |
|---|---|---|---|---|
| 6,947,905 B1 * | 9/2005 | Starr | ....................... | G06Q 10/06 705/37 |
| 7,324,966 B2 * | 1/2008 | Scheer | ................. | G06Q 10/087 705/28 |
| 7,497,369 B2 * | 3/2009 | Dalzell | ................. | G06Q 30/02 235/375 |
| 7,707,074 B1 * | 4/2010 | Cotton | ................. | G06Q 10/087 705/27.2 |
| 8,190,465 B2 * | 5/2012 | Lokowandt | ........ | G06Q 10/0631 700/100 |
| 8,271,432 B2 * | 9/2012 | D'Ambrosio | ..... | G06F 17/30675 707/607 |
| 8,346,622 B2 * | 1/2013 | Shetty | .................... | G06Q 30/06 705/26.61 |
| 8,744,937 B2 * | 6/2014 | Seubert | .................. | G06Q 10/10 705/35 |
| 8,799,100 B2 * | 8/2014 | Walker | ................... | G06Q 40/12 705/26.1 |
| 8,838,612 B2 * | 9/2014 | Berlener | ............. | G06Q 10/087 705/26.81 |
| 8,880,558 B2 * | 11/2014 | Deng | ....................... | G06F 8/10 707/798 |
| 9,092,810 B2 * | 7/2015 | Kajamohideen | | |

(Continued)

*Primary Examiner* — Andrew Joseph Rudy
(74) *Attorney, Agent, or Firm* — Lowenstein Sandler LLP

(57) ABSTRACT

Implementations for associating stackable subscriptions with varying attribute coverage are disclosed. In one example, the method includes receiving a fulfillment requirement associated with a computing system, selecting a first product subscription from a plurality of product subscriptions in a data store, determining whether the first product subscription partially satisfies the fulfillment requirement, selecting a second product subscription from the plurality of product subscriptions when the first product subscription partially satisfies the fulfillment requirement, determining whether an addition of the second product subscription to the first product subscription satisfies the fulfillment requirement, and associating the first and second product subscriptions with the computing system when the addition of the second product subscription to the first product subscription satisfies the fulfillment requirement.

14 Claims, 4 Drawing Sheets

(56) References Cited

U.S. PATENT DOCUMENTS 9,159,093 B1 * 10/2015 Fastenau
9,189,768 B2 * 11/2015 Plaster ................. G06Q 10/087

* cited by examiner

ASSOCIATING INTERDEPENDENT SUBSCRIPTIONS

TECHNICAL FIELD

The present disclosure relates to associating interdependent subscriptions, and more specifically to a method and system for associating stackable subscriptions with varying attribute coverage.

BACKGROUND

A software provider can sell a number of different software and/or service products. As used throughout this disclosure, the term "software" refers to computer readable instructions and other operating information used by a computing system or processing device. For example, a software provider can sell product subscriptions to customers for the software and service products. An entity that has purchased a subscription to a product is an owner of the product subscription. An owner's use of a product subscription can be represented, for example, as an "entitlement." For example, a customer, such as ACME Company, purchases ten 3-year product subscriptions to Enterprise Software ABC and thus, ACME Company is an owner of the ten product subscriptions. Ten entitlements represent the ten product subscriptions. An owner can then assign the ten entitlements, for example, to various systems. When the owner installs the Enterprise Software ABC on a computing system, the computing system is granted one of the ten entitlements.

Once a computing system has been granted an entitlement, the computing system is registered and subscribed to receive software content from the software provider for the duration of the product subscription. For example, a computing system granted an entitlement by ACME Company receives software content from Enterprise Software ABC for 3 years if ACME Company purchased ten 3-year product subscriptions to Enterprise Software ABC. Once the product subscription expires, the entitlement also expires and will no longer be valid, and the computing system will no longer receive software content from the software provider. A user of the computing system will no longer be able to use the software or service once the entitlement has expired, and a break in coverage may be experienced.

Software providers can sell product subscriptions based on product business models. For example, the product business model for Enterprise Software ABC may be to sell product subscriptions to the Enterprise Software ABC on a per-CPU-socket-pair basis. Each of ACME Company's ten entitlements are valid for systems that each have two populated CPU sockets. Thus, ACME Company should assign two entitlements to a system that has four populated CPU sockets. For this example, a compliant system would have the correct number of product, subscriptions in view of the number of entitlements and CPU sockets on the system.

Typically, the enforcement of a software provider's product business model for a particular product is hard-coded in the product source code itself. For example, the product source code for Enterprise Software ABC is hard-coded to enforce the entitlements for the Enterprise Software ABC on a "per-CPU-socket-pair" basis.

Conventional solutions can require a system administrator to determine which computing systems have entitlements. The system administrator should then manually select product subscriptions (if available) to use to grant an entitlement for each computing system with an expired entitlement. Once a product subscription has been selected by the system administrator, it can be used as an entitlement for the computing system in order to provide access to the software for the computing system. Using this manual process, a break in coverage can be experienced by a user of the computing system while the system administrator obtains a new entitlement for the computing system. Moreover, having a system administrator manually select product subscriptions may be feasible when there are a small number of computing systems. However, the manual selection can be difficult when there are a large number of product subscriptions with varying attributes and with different fulfillment requirements. As the number of available product subscriptions increases, the complexity of the selection increases exponentially to the extent that the time needed to determine and select the appropriate product subscriptions to attach to a computer system grows by a factor of $2^n$, which increases the time required to produce a set of product subscriptions for a client computer system.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Implementations of the disclosure provide for associating interdependent product subscriptions. The increasing number of available product subscriptions exponentially increases the complexity of the determining and selecting an appropriate product subscription, thereby increasing the workload of the selection process. The ability to mitigate this workload and to quickly select the appropriate product subscription is critical to maintaining an efficient computing system.

In one implementation a subscription association system is provided to receive a fulfillment requirement associated with a computing system, select a product subscription from a data store and determine whether the selected product subscription partially satisfies the fulfillment requirement. When the fulfillment requirement is partially satisfied, the subscription association system can select another product subscription from the data store and determine whether this additional product subscription satisfies the fulfillment requirement. If so, the product subscriptions are associated with the computing system. The subscription association system provides for faster and more accurate deployment of subscriptions.

Figure 1:
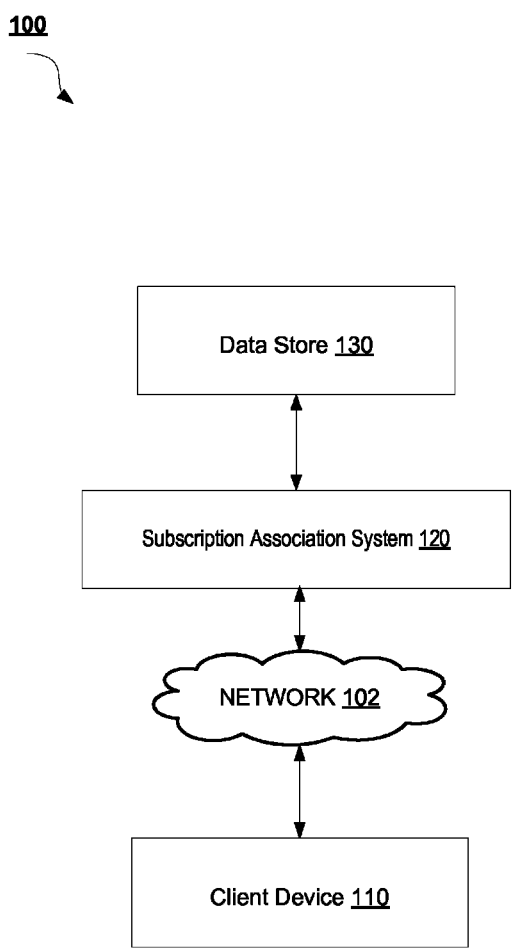
FIG. 1 depicts a block diagram of a network architecture for associating interdependent subscriptions in which implementations of the present disclosure can operate.

FIG. 1 depicts a block diagram of a network architecture 100 for associating independent product, subscriptions in which implementations of the present disclosure can operate. The network architecture 100 includes a subscription association system 120 communicably coupled to a data store 130. The subscription association system 120 can also be and communicably coupled to a client device 110 via network 102. Network 102 may be a private network (e.g., a local area network (LAN), a wide area network (WAN), intranet, or other similar private networks) or a public network (e.g., the Internet).

Software providers can develop and/or sell one or more software products and/or service products. A software provider can be a large software company that develops and sells operating system platforms, an independent software vendor that develops and sells specialized software to run on an operating system platform, and/or an independent service provider that does not develop, but sells software products and/or service products.

Customers can purchase product subscriptions to the software and service products. An entity that has purchased a subscription to a product is an owner of the product subscription. A purchase of a product subscription is an owner's right to use the product for the period of the subscription. An owner's use of a product subscription can be represented, for example, as an "entitlement." Software may or may not already be installed on an entity. Software that is already installed on an entity can be somewhat usable, even if the entity is not granted an entitlement for the installed software. When an entity is granted an entitlement for the software, the entity can access a product repository to allow the entity to receive software updates. For example, suppose that an independent software vendor develops and sells a software product called Enterprise Software ABC. A customer, ACME Company, purchases ten 3-year subscriptions to Enterprise Software ABC, which is represented by ten entitlements. ACME Company may already have the Enterprise Software ABC already installed in one or more systems. When the one or more systems are granted entitlements for the Enterprise Software ABC, the systems can receive updates for the Enterprise Software ABC.

A product subscription can be an independent product subscription or an interdependent product subscription. As used herein, the term "independent subscriptions" is interpreted as a product subscription that does not rely on or does not need to interact with another product subscription in order to function properly. As used herein, the term "interdependent subscriptions" is interpreted as a product subscription that relies on, inter-relates with, or interacts with another product subscription in order to function properly.

An entity can be a potential consumer or an existing consumer of an entitlement. A consumer is an entity that has been granted an entitlement to allow the entity to consume (use) one or more products and to grant the entity access to one or more product repositories for receiving product updates. For example, when an entity is granted an entitlement for the Enterprise Software ABC, the entity is a consumer of the Enterprise Software ABC. Examples of entities include, and are not limited to, a person, a client computing system, a server computing system, a domain, etc.

The subscription association system 120 may include one or more machines such as server computers, desktop computers, or any other computing device. In an example, the subscription association system 120 can track which product subscriptions have been purchased and which of the purchased subscriptions have been consumed. The tracking of purchased and consumed products is hereinafter referred to as "product asset management." The subscription association system 120 can include a server which can be hosted by any type of computing device including server computers, gateway computers, desktop computers, laptop computers, hand-held computers or similar computing device. An example computing device is described in greater detail below in conjunction with FIG. 4. The server can host a product asset management module for tracking what products an owner has purchased and which of the products an owner has consumed (e.g., make use of a product subscription).

In one example, the subscription association system 120 is a web application hosted by a server and accessible via a client device 110. For example, ACME Company may be a small customer, and its environment can include one or more client devices 110 that can communicate to the subscription association system 120 via network 102. In an example, the subscription association system 120 can include, and is not limited to, a web application based on a REST (Representational State Transfer) client-server architecture.

The client device 110 can be hosted by any type of computing device including server computers, gateway computers, desktop computers, laptop computers, mobile communications devices, cell phones, smart phones, hand-held computers, or similar computing device. In one example, a client device 110 includes a programmatic REST interface to communicate with the subscription association system 120. In other examples, the client device 110 can include, and is not limited to, a web interface, web browser, or other client software.

The subscription association system 120 can store data of the products which a customer has purchased and consumed in data repository or a data store 130 that is coupled to the server 150. The data store 130 may be part of the subscription association system 120 or may be coupled to the subscription association system 120 directly or via the network 102. The data store 130 can be a persistent storage unit that stores product subscriptions and their associated rules. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A "set," as used herein, refers to any positive whole number of items.

Figure 2:
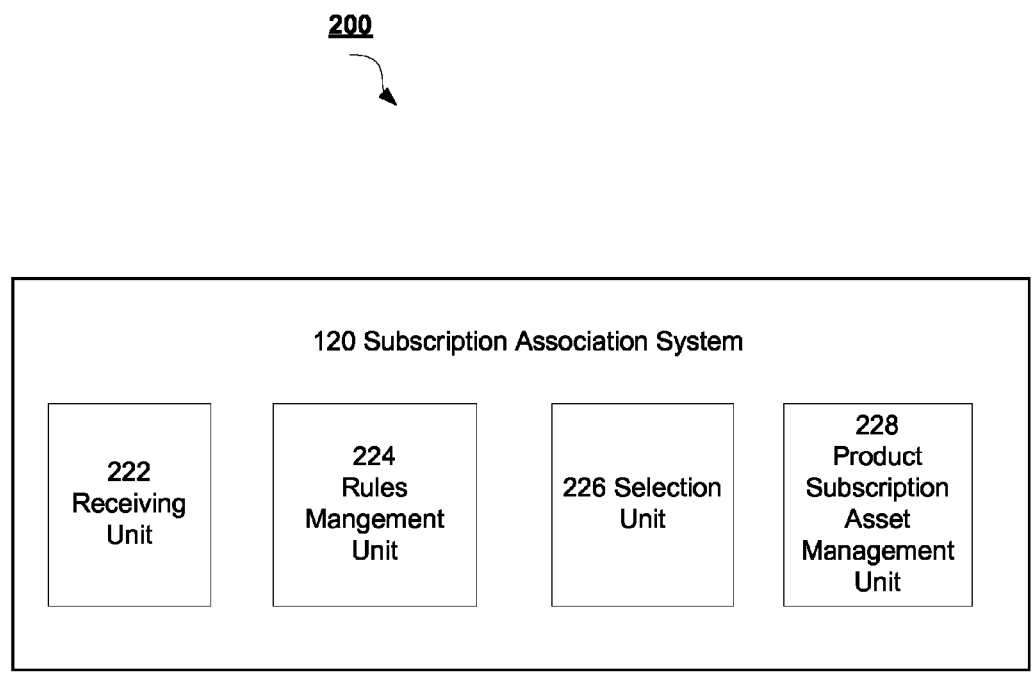
FIG. 2 illustrates a block diagram of a subscription association system in accordance with some implementations of the present disclosure.

FIG. 2 illustrates a block diagram of a subscription association system 120 in accordance with some implementations of the present disclosure. In FIG. 2, the subscription association system 120, of examples of the disclosure, can include a receiving unit 222, a rules management unit 224, a selection unit 226, and a product subscription asset management unit 228.

The receiving unit 222 can receive a fulfillment requirement from the client device 110. An example of a fulfillment requirement is a metric-based component of the client device. The metric can represent a service level of support of the computing system (e.g., entitled to on-site support, telephone support, e-mail support, access to an instructional web-site etc.), an architecture of the client device 110 (e.g., x86_64, i686, x390x, etc.), a set of product subscription entitlements of the client device 110, a number of populated CPU sockets in the computing system, the number of cores per CPU in the client device 110, or an amount of random access memory of the client device 110.

The rules management unit 224 may examine subscription data associated with the client device 110 to determine whether the owner or client (e.g., ACME Company) has purchased subscriptions for certain product subscriptions. In an example, the subscription data associated with the client device 110 may reside in the data store 130. The subscription data can include, but is not limited to, rules to enforce product subscription models such as rules and data representing the product subscriptions that one or more clients have purchased, the quantity of the purchased products, the time period the purchase is valid for, and the like. For example, the subscription data can indicate that Owner_A (e.g., ACME Company) has purchased one hundred 3-year subscriptions to Enterprise Software ABC and fifty 1-year subscriptions to Enterprise Virtualization Software. Examples of subscription data can include, and are not limited to, an owner or client identifier, product subscriptions identifiers, entitlement identifiers, validation identifiers, etc. The subscription data can be existing internal data, for example, that is maintained by a software provider sales and/or accounting departments or can be a copy of the existing data.

The rules management unit 224 can also examine the rules and requirements of the product subscriptions in the data store 130. The rules management unit 224 can remove product subscriptions from consideration when they do not match the service level override or service level of the client device 110. The rules management unit 224 can also remove product subscriptions from consideration, for example, when the product subscription requires an architecture that does not match that of the client device 110, or when the subscription data associated with the client computer indicates that the quantity of a certain product subscription is zero or when the product subscription has a date that is not valid.

The selection unit 226 may select one or more product subscriptions from a plurality of product subscriptions in the data store 130. The selection unit 226 can construe the fulfillment requirement from the client device 110 and select the product subscriptions can be made in view of its understanding of the fulfillment requirement. For example, the fulfillment requirement can include a list of installed product subscriptions on the client device 110 and other metrics as discussed above. In an example, the selection unit 226 can select the latest and updated entitled product subscriptions associated with the list of installed product subscriptions on the client device 110. The selection of the product subscriptions can then be validated by the rules management unit 224, for example, to confirm that the client device 110 has sufficient resources such as memory or CPU sockets to host the selected product subscription.

The product subscription asset management unit 228 can maintain and store the fulfillment requirement from the client device 110 so that the subscription association system 120 has a record of the attributes (e.g., a service level of support of the computing system, an architecture of the computing system, a set of product subscription entitlements of the computing system, a number of CPU cores in the computing system, a number of CPU sockets of the computing system, or an amount of random access memory of the computing system, etc.) of the client device 110. The product subscription asset management unit 228 can also maintain the selected product subscriptions from the selection unit 226.

Figure 3:
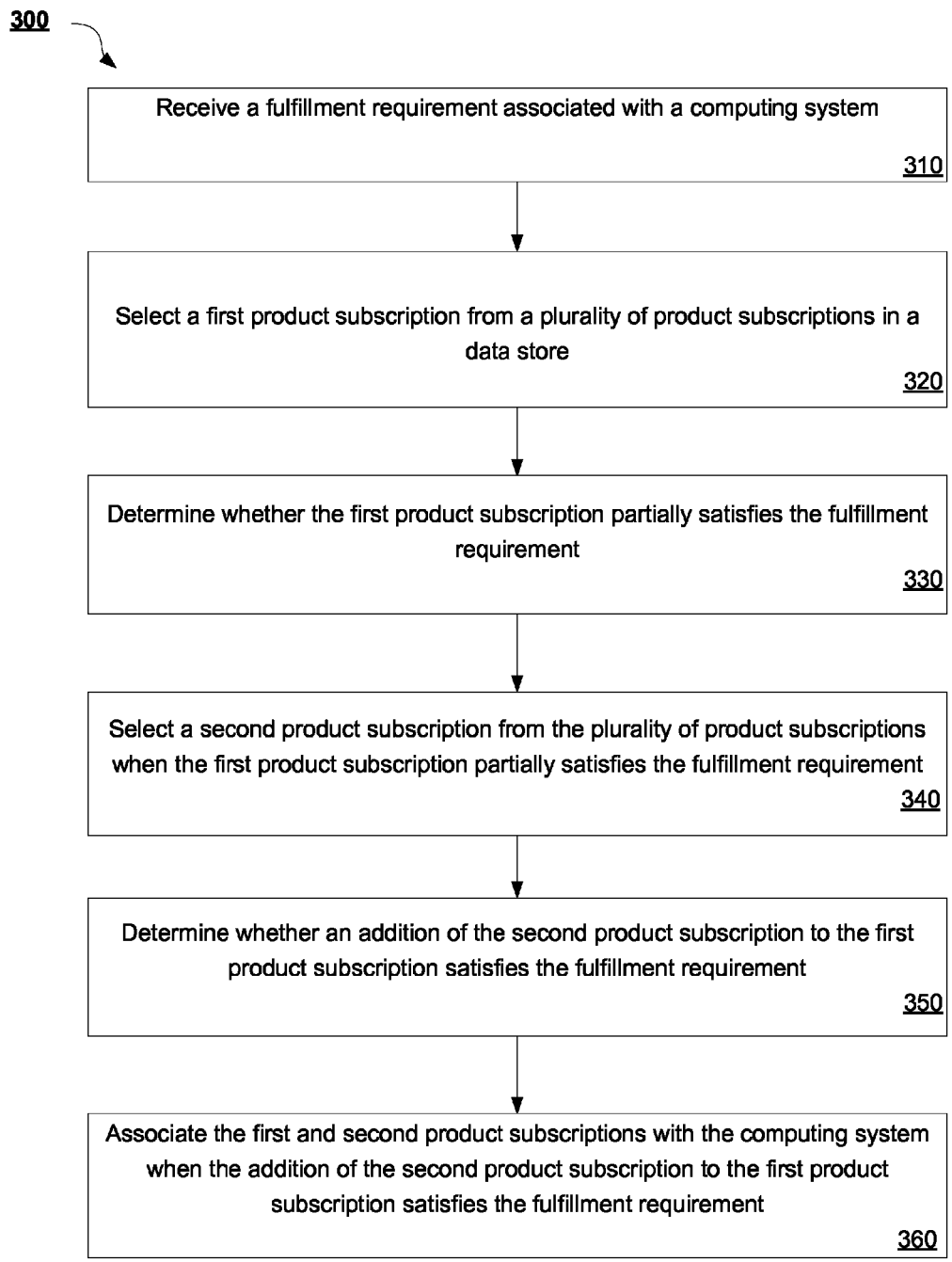
FIG. 3 shows a flow diagram illustrating an example for associating interdependent subscriptions in accordance with some implementations of the present disclosure.

FIG. 3 shows a flow diagram illustrating a method 300 for associating interdependent subscriptions in accordance with some implementations of the present disclosure. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by the subscription association system 120 described with respect to FIG. 1.

Method 300 begins at block 310, where the subscription association system 120 receives a fulfillment requirement associated with a computing system. An example of the fulfillment requirement can be a metric of a component of the computing system, such as a service level of support of the computing system, an architecture of the computing system, a set of product subscription entitlements of the computing system, a number of CPU cores in the computing system, a number of CPU sockets of the computing system, or an amount of random access memory of the computing system.

Subsequently, at block 320, the subscription association system 120 can select, using the received fulfillment requirement, a first product subscription from a plurality of product subscriptions in a data store. Each product subscription in the data store can include metadata associated with the respective product subscription. The metadata includes, for example, rules and specific information about the product subscription such as whether the product subscription is an independent or an interdependent product subscription, an architecture of the computing system that can execute the first product subscription, a number of CPU cores or an amount of random access memory on the client computer system that is needed for the product subscription, and the like.

The metadata for a respective product subscription can also include an identifier that indicates a range of dates in which the product subscription is valid. The subscription association system 120 can select the first product subscription when a present date is within the first range of dates as indicated in the metadata of the first product subscription.

The metadata for a respective product subscription can also include an identifier that indicates a level of support service for the product subscription. As discussed above, a service level of support can be, for example, on-site support, telephone support, e-mail support, and access to an instructional web-site, etc. The subscription association system 120 can select the first product subscription when the service level of support associated with the product subscription is consistent with the service level of support associated with the client computer system. For example, in a hypothetical instance where the service level of support associated with the first product subscription is "access to the instructional web-site" and the service level of support associated with the client computer system is "on-site support," the subscription association system 120 can determine that the product subscription is not suitable for the client computer system, and therefore this product subscription will not be selected.

In an example, the subscription association system 120 can select an independent product subscription. As discussed above, an independent product subscription does not rely on or does not need to interact with another product subscription in order to function properly, while an interdependent product subscription relies on, inter-relates with, or interacts with another product subscription in order to function properly.

In an example, two completely different and independent product subscriptions can be stacked or associated with each other so that they can be grouped together to satisfy the fulfillment requirement of the client computer device. For example, each product subscription has a respective stacking identifier that indicates whether the independent product subscription can be stacked with another independent product subscription. In an example, when the stacking identifiers of the respective independent product subscriptions are the same, the subscription association system 120 can stack or group the independent product subscriptions to be attached to the client computer system.

The selection of the first product subscription can be based on the information from the received fulfillment requirement as discussed above with reference to block 310. For example, when the information from the fulfillment requirement indicates a set of product subscription entitlements of the computing system, the subscription association system 120 can consider one of the entitlements to be selected. In another example, when the fulfillment requirement information indicates a number of CPU cores in the computing system, a number of CPU sockets of the computing system, or an amount of random access memory of the computing system, the subscription association system 120 can compare the fulfillment requirement information with the rules from the metadata of the product subscription to determine whether the selection is warranted.

Next, at block 330, the subscription association system 120 can determine whether the first product subscription partially satisfies the fulfillment requirement. In a hypothetical example for descriptive purposes, suppose the fulfillment requirement information regarding a client computer system indicates that the client computer system has 8 CPU cores. Furthermore, suppose that the subscription association system 120 determines that the selected first product subscription has a rules restriction such that it is approved for execution in only 2 CPU cores. In this hypothetical case, the fulfillment requirement is partially satisfied because the client computer system has 6 CPU cores that can be fulfilled with additional product subscriptions.

At block 340, the subscription association system 120 can select a second product subscription from the plurality of product subscriptions when the first product subscription partially satisfies the fulfillment requirement. For example, the subscription association system 120 can select an interdependent product subscription as the second product subscription. The second interdependent product subscription can be selected in view of the stacking identifier for each respective product subscription. For example, the subscription association system 120 can select a second product subscription when its associated stacking identifier is the same as the stacking identifier associated with the first product subscription. The subscription association system 120 can also select the second product subscription in view of the metadata of the second product subscription including its rules and requirement, similar to the process used for selecting the first product subscription as discussed above.

At block 350, the subscription association system 120 can determine whether an addition of the second product subscription to the first product subscription satisfies the fulfillment requirement. The subscription association system 120 can combine the information from the metadata associated with the respective first and second product subscriptions. In view of the fulfillment requirement associated with the client computer system, the subscription association system 120 can determine whether the combination of the first and second product subscriptions satisfies the fulfillment requirement. For example, suppose the fulfillment requirement information regarding the client computer system indicates that the client computer system has 8 CPU cores. Furthermore, suppose that the subscription association system 120 determines that the selected first product subscription has a rules restriction such that it is approved for execution in only 2 CPU cores, and that the selected second product subscription is approved in 6 CPU cores. In this hypothetical case, the fulfillment requirement is satisfied with respect to the number of CPU cores because the combined first and second product subscriptions fulfill the 8 CPU cores of the client computer system. The subscription association system 120 can proceed with a similar analysis with respect to the additional aspects of the fulfillment requirement of the client computer system and the first and second product subscriptions.

Lastly, at block 360, the subscription association system 120 associates the first and second product subscriptions with the computing system when the addition of the second product subscription to the first product subscription satisfies the fulfillment requirement associated with the client computer system. In an example, prior to associating the first and second product subscriptions with the computing system, the subscription association system 120 can validate the first and second product subscription by referencing data in a repository that includes contract information with respect to the client computer system. For example, if the data indicates that the client has not paid his or her bill or if the number of entitlements from the fulfillment requirement associated with the computer system is inconsistent with the number of entitlements as set forth in the contract, then the subscription association system 120 can determine that the first and second product subscriptions are not valid for the client computer system.

In another example, when the addition of the second product subscription to the first product subscription does not satisfy the fulfillment requirement associated with the client computer system, the subscription association system 120 can select a third product subscription from the plurality of product subscriptions in view of metadata associated with the third product subscription and in view of the fulfillment requirement associated with the client computer system. The subscription association system 120 can determine whether the addition of the third product subscription to the first and second product subscriptions satisfies the fulfillment requirement, and can associate the first, second, and third product subscriptions with the client computing system when the addition of the third product subscription to the first and second product subscriptions satisfies the fulfillment requirement.

Figure 4:
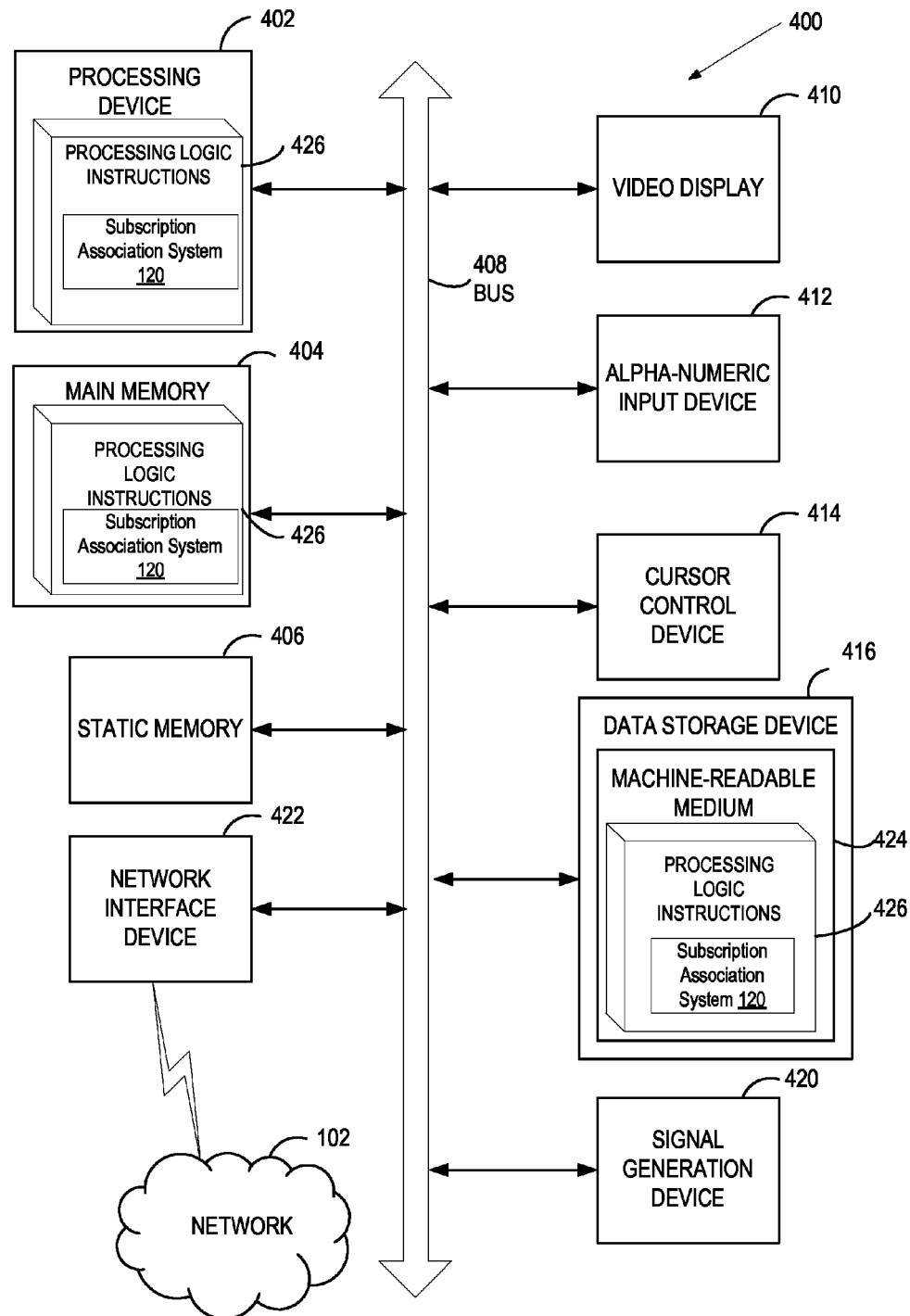
FIG. 4 shows a diagrammatic representation of a machine in the form of a computer system, in accordance with one example.

FIG. 4 depicts a diagrammatic representation of a machine in the form of a computer system 400 within which a set of memory instructions, for causing the machine to perform any one or more of the methodologies discussed herein, may be executed. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 400 includes a processing device 402 (e.g., a processor), a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a secondary memory 416 (e.g., a data storage device), which communicate with each other via a bus 408.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute the operations for the subscription association system 120 for performing steps discussed herein.

The computer system 400 may further include a network interface device 422. The network interface device may be in communication with a network 102. The computer system 400 also may include a video display unit 410 (e.g., a liquid crystal display (LCD), a touch screen, or a cathode ray tube (CRT)), an alphanumeric input device 412 (e.g., a keyboard), a cursor control device 414 (e.g., a mouse), and a signal generation device 420 (e.g., a speaker).

The secondary memory 416 may include a computer-readable storage medium (or more specifically a non-transitory computer-readable storage medium) 424 on which is stored one or more sets of instructions 426 (e.g., instructions executed by the subscription association system 120) for the computer system 400 representing any one or more of the methodologies or functions described herein. The instructions 426 for the computer system 400 may also reside, completely or at least partially, within the main memory 404 and/or within the processing device 402 during execution thereof by the computer system 400, the main memory 404 and the processing device 402 also constituting computer-readable storage media. The instructions 426 for the computer system 400 may further be transmitted or received over a network via the network interface device 422.

While the computer-readable storage medium 424 is shown in an example to be a single medium, the term "computer-readable storage medium" should be taken to include a single medium or multiple media (e.g., a centralized or distributed database, and/or associated caches and servers) that store the one or more sets of instructions 426. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media.

Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "associating," "executing," "adjusting," "sending," "receiving," "determining," "transmitting," "identifying," "specifying," "granting," "accessing," "assigning," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
  receiving, by a processing device from a computing system, a fulfillment requirement corresponding to computing resources of the computing system, wherein the fulfillment requirement comprises at least one of a service level of support of the computing system, an architecture of the computing system, a set of product subscription entitlements of the computing system, a number of CPU cores in the computing system, a number of CPU sockets of the computing system, or an amount of random access memory of the computing system;
selecting a first product subscription from a plurality of product subscriptions in a data store;
determining, by the processing device, the first product subscription partially satisfies the fulfillment requirement;
selecting, by the processing device, a second product subscription from the plurality of product subscriptions;
determining, by the processing device, the fulfillment requirement is satisfied by the first product subscription and the second product subscription;
associating, by the processing device, the first product subscription and the second product subscription with the computing system;
granting, by the processing device, a first entitlement to the computing system, wherein the first entitlement enables access by the computing system to a data repository; and
providing an update corresponding to the first product subscription or the second product subscription in response to a request for access by the computing system to the data repository in accordance with the first entitlement.

2. The method of claim 1, further comprising:
assigning a first stacking identifier to the first product subscription and a second stacking identifier to the second product subscription;
determining the first stacking identifier is the same as the second stacking identifier; and
stacking the first product subscription with the second product subscription to generate a stacked product subscription.

3. The method of claim 2, further comprising validating that the stacked product subscription is compliant with the fulfillment requirement.

4. The method of claim 3, further comprising associating the stacked product subscription with the computing system.

5. The method of claim 1, further comprising:
selecting a third product subscription from the plurality of product subscriptions;
determining a further addition of the third product subscription to the first and second product subscriptions satisfies the fulfillment requirement; and
associating the first product subscription, the second product subscription, and the third product subscription with the computing system.

6. The method of claim 1, wherein the first product subscription comprises a first identifier indicating a first range of dates and the second product subscription comprises a second identifier indicating a second range of dates, further comprising:
determining a present date is within each of the first range of dates and the second range of dates; and
associating the first product subscription and the second product subscription with the computing system.

7. The method of claim 6, wherein the first identifier further comprises a first service level and a first architecture type of the first product subscription and wherein the second identifier further comprises a second service level and a second architecture type of the second product subscription, further comprising:
receiving a third identifier indicating at least one of a service level of the computing system or an architecture type of the computing system; and
determining the first architecture type and the second architecture type are same as the architecture type of the computing system;
determining the first service level and the second service level are same as the service level of the computing system; and
associating the first and second product subscriptions with the computing system.

8. A system comprising:
a memory device; and
a processing device operatively coupled to the memory device, the processing device to:
receive, from a computing system, a fulfillment requirement corresponding to computing resources of the computing system, wherein the fulfillment requirement comprises at least one of a service level of support of the computing system, an architecture of the computing system, a set of product subscription entitlements of the computing system, a number of CPU cores in the computing system, a number of CPU sockets of the computing system, or an amount of random access memory of the computing system;
select a first product subscription from a plurality of product subscriptions in a data store;
determine the first product subscription partially satisfies the fulfillment requirement;
select a second product subscription from the plurality of product subscriptions;
determine the fulfillment requirement is satisfied by the first product subscription and the second product subscription;
associate the first product subscription and the second product subscription with the computing system;
grant, by the processing device, a first entitlement to the computing system, wherein the first entitlement enables access by the computing system to a data repository; and
provide an update corresponding to the first product subscription or the second product subscription in response to a request for access by the computing system to the data repository in accordance with the first entitlement.

9. The system of claim 8, wherein the processing device further to:
assign a first stacking identifier to the first product subscription and a second stacking identifier to the second product subscription;
determine the first stacking identifier is same as the second stacking identifier; and
stack the first product subscription with the second product subscription to generate a stacked product subscription.

10. The system of claim 9, the processing device to validate that the stacked product subscription is compliant with the fulfillment requirement.

11. The system of claim 10, the processing device to associate the stacked product subscription with the computing system.

12. A non-transitory machine-readable storage medium comprising instructions that, if executed by a processing device, cause the processing device to:

receive, by the processing device from a computing system, a fulfillment requirement corresponding to computing resources of the computing system, wherein the fulfillment requirement comprises at least one of a service level of support of the computing system, an architecture of the computing system, a set of product subscription entitlements of the computing system, a number of CPU cores in the computing system, a number of CPU sockets of the computing system, or an amount of random access memory of the computing system;

select a first product subscription from a plurality of product subscriptions in a data store;

determine the first product subscription partially satisfies the fulfillment requirement;

select a second product subscription from the plurality of product subscriptions;

determine the fulfillment requirement is satisfied by the first product subscription and the second product subscription;

associate the first product subscription and the second product subscription with the computing system;

grant, by the processing device, a first entitlement to the computing system, wherein the first entitlement enables access by the computing system to a data repository; and provide an update corresponding to the first product subscription or the second product subscription in response to a request for access by the computing system to the data repository in accordance with the first entitlement.

13. The non-transitory machine-readable storage medium of claim 12, the processing device further to:

assign a first stacking identifier to the first product subscription and a second stacking identifier to the second product subscription;

determine the first stacking identifier is same as the second stacking identifier; and stack the first product subscription with the second product subscription.

14. The non-transitory machine-readable storage medium of claim 13, the processing device further to validate that the stacked product subscription is compliant with the fulfillment requirement.

* * * * *